United States Patent [19]
DiCresce

[11] Patent Number: 5,991,744
[45] Date of Patent: Nov. 23, 1999

[54] METHOD AND APPARATUS THAT PROCESSES FINANCIAL DATA RELATING TO WEALTH ACCUMULATION PLANS

[75] Inventor: Gary P. DiCresce, Saratoga Springs, N.Y.

[73] Assignee: Gary P. DiCresce & Associates, Saratoga Springs, N.Y.

[21] Appl. No.: 08/962,457

[22] Filed: Oct. 31, 1997

[51] Int. Cl.[6] .............................. G06F 17/60; G06F 19/00
[52] U.S. Cl. .................................... 705/36; 705/4; 705/35
[58] Field of Search ..................................... 705/4, 35, 36

[56] References Cited

U.S. PATENT DOCUMENTS

| 3,500,030 | 3/1970 | Clarke | 705/36 |
|---|---|---|---|
| 4,648,037 | 3/1987 | Valentino | 705/36 |
| 4,750,121 | 6/1988 | Halley et al. | 705/35 |
| 4,876,648 | 10/1989 | Lloyd | 705/38 |
| 4,953,085 | 8/1990 | Atkins | 705/36 |
| 4,969,094 | 11/1990 | Halley et al. | 705/36 |
| 5,126,936 | 6/1992 | Champion et al. | 705/36 |
| 5,206,803 | 4/1993 | Vitagliano et al. | 705/39 |
| 5,214,579 | 5/1993 | Wolfberg et al. | 705/36 |
| 5,523,942 | 6/1996 | Tyler et al. | 705/4 |
| 5,590,037 | 12/1996 | Ryan et al. | 395/204 |
| 5,745,706 | 4/1998 | Wolfberg et al. | 705/35 |
| 5,749,077 | 5/1998 | Campbell | 705/36 |
| 5,761,441 | 6/1998 | Bennett | 705/35 |
| 5,802,500 | 9/1998 | Ryan et al. | 705/36 |
| 5,806,047 | 9/1998 | Hackel et al. | 705/36 |
| 5,812,987 | 9/1998 | Luskin et al. | 705/36 |
| 5,839,118 | 11/1998 | Ryan et al. | 705/36 |

OTHER PUBLICATIONS

The Evergreen Group, Inc. "ISOP Insured Security Option Plan: Funding for Executive SERPs and Deferred Compensation".
Conrail Group Carve Out Funding Models, prep. by Gary P. DiCresce & Associates, Saratoga Springs, New York.

Primary Examiner—Allen R. MacDonald
Assistant Examiner—James W. Myhre
Attorney, Agent, or Firm—Robert S. Babayi; Burns Doane Swecker & Mathis

[57] ABSTRACT

A digital computer produces data corresponding to results of different financial plans. Contribution data corresponding to contributions to an account created under the plan are entered into the digital computer. The digital computer produces data representing after tax cost of interest for cash value loan amounts corresponding to cumulative cash values of an insurance contract issued based on the contribution. Then, the digital computer outputs data representing investment income derived from the cash value loan amounts less after tax cost of interest to a display device.

46 Claims, 12 Drawing Sheets

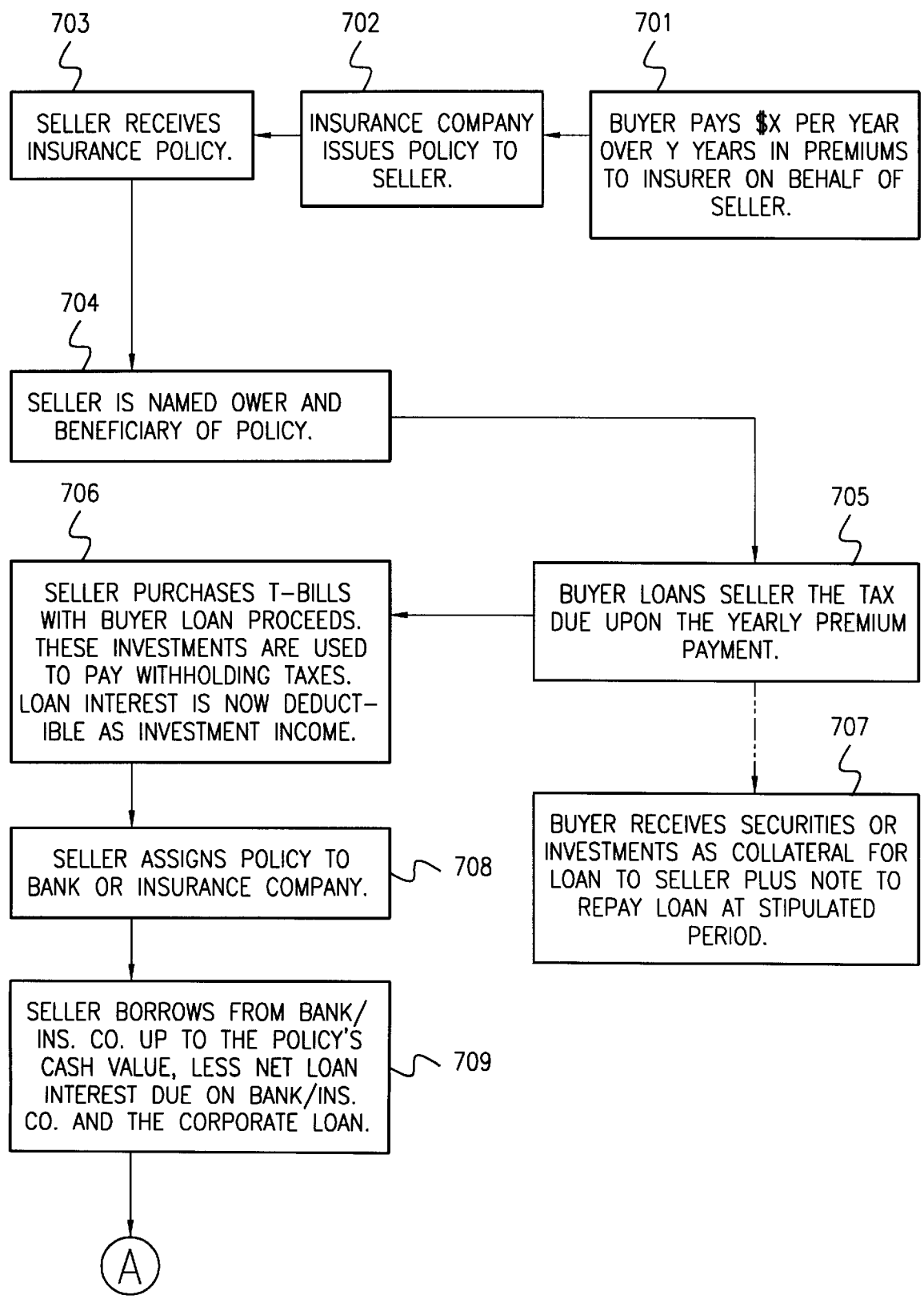

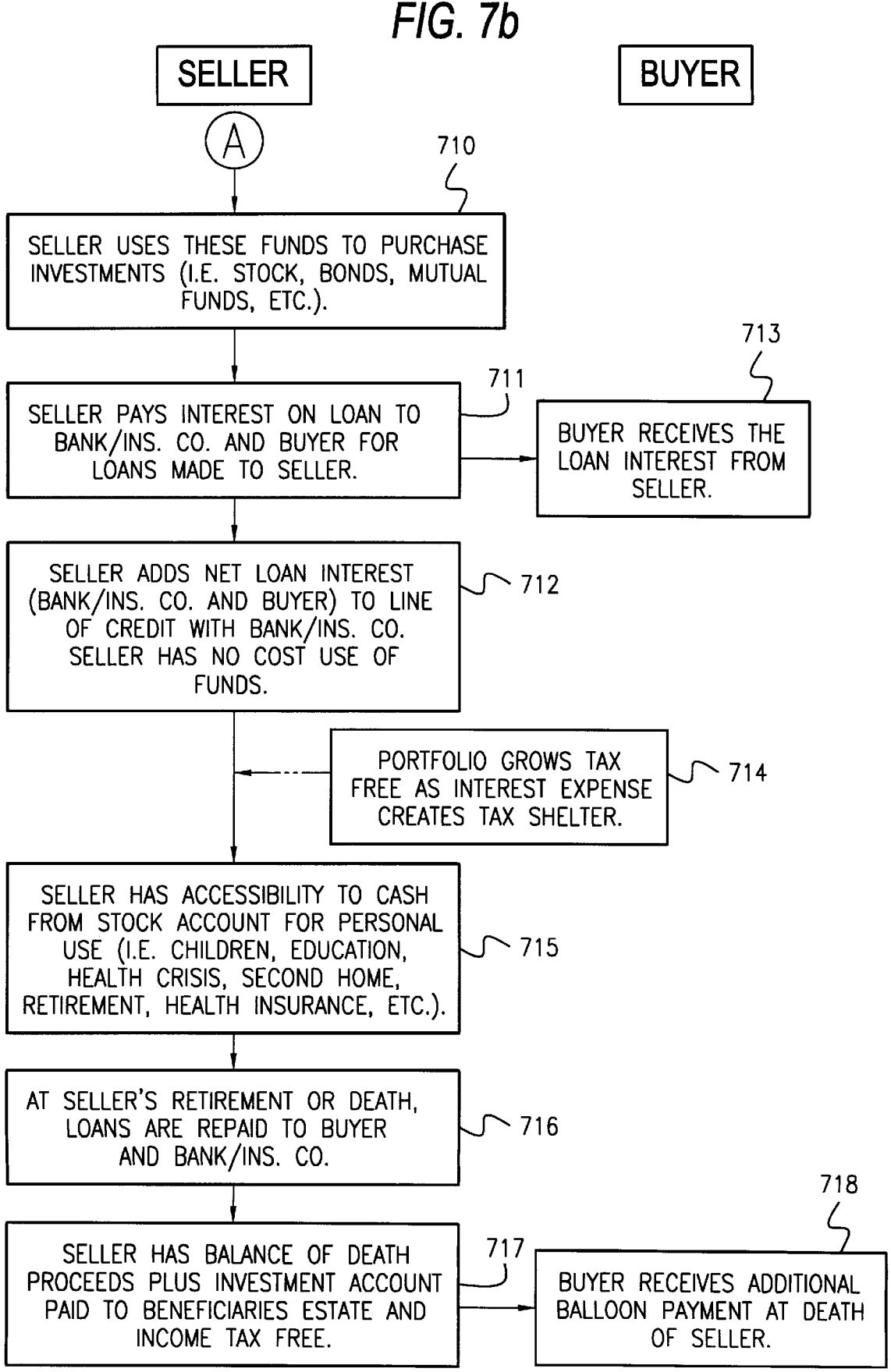

METHOD AND APPARATUS THAT PROCESSES FINANCIAL DATA RELATING TO WEALTH ACCUMULATION PLANS

The present invention relates to the field of financial data processing, more particularly, to processing in a digital computer financial data relating to various funding methods, including funding a personal wealth accumulation plan, a deferred employee compensation plan, a pension plan, a stock option plan, an employee benefit plan, and an installment sale plan.

Various financial plans have been used to create and utilize capital under a wide variety of individual and corporate settings. For example, corporations use financial plans to increase corporate capital, fund fringe benefit expenses, provide leverage to acquire other businesses, either on an installment basis or in a leveraged-buy-out (LBO). An individual uses a financial plan primarily for personal wealth accumulation. Except for some government sponsored tax free investment instruments, most other wealth accumulation plans produce some level of tax liability when gains are realized. Under current tax laws, investment income on short term capital gains is taxable as ordinary income. Usually, investment income on long term gains is taxed at a specified rate. Of course, taxation of investment income reduces compounding of assets and consequently return on investment. Therefore, individuals and corporations are interested in financial plans that decrease tax liabilities while maximizing wealth accumulation potential.

As a part of their compensation package, most employers offer a wide array of fringe benefit plans to their employees. Usually, employers use the offered fringe benefits as a vehicle to attract qualified employees into their work force. These benefit plans include health and life insurance plans as well as deferred compensation, pension, stock option plans, and/or Other Post Employment Retirement Benefits (OPEBs). The overall objective of these benefit plans is to provide employees with short term and long term wealth accumulation potential during employment and income security during retirement. In order to lower fringe benefit cost, some large corporations fund and manage their own plans. Smaller corporations and firms pay premiums to an insurance carrier for group plans. Although fringe benefit expenses are tax deductible, the employers do not recover the after tax cost of providing these benefit. Moreover, the rising cost of providing fringe benefits, especially health insurance benefits, has increased funding requirements, thereby reducing profits, capital growth and savings for corporations and stockholders. Therefore, corporations are constantly searching for financial plans that reduce their fringe benefit cost, without sacrificing the quality of offered fringe benefits, which could make employing a qualified work force more difficult.

In the United States, individual saving has been on the decline since the late 1960's. By recognizing that a systematic saving plan is needed to achieve financial independence and security for all Americans, the U.S. Congress has enacted laws that allow individuals to defer tax consequences of their ordinary income by saving in qualified plans. Current laws provide tax incentives to employers that contribute to their employees' qualified plans. As a result, many big multi-national corporations and small firms fund qualified employee retirement plans, such as 401-k plans. Generally, employees contribute periodically to qualified accounts, to create an investment portfolio that is managed by the employer. Similar to fringe benefit plans, the after tax costs of the qualified plans are not recoverable, even though employer contributions to the qualified accounts are deductible. Moreover, current laws set severe penalties and adverse tax consequences, if an individual withdraws funds from his or her retirement account before retirement age, effectively removing from the individual the flexibilty of controlling his or her own investment portfolio. In any event, the wealth accumulated in the qualified accounts becomes taxable when an employee retires. Furthermore, in order to insure government compliance, conventional qualified plans require significant administrative overhead, mostly relating to lenghty government filings.

Financial instruments have also been used for funding various types of installment sale transactions. Often, buyers would like to lower present value cost of their purchase. Whereas, sellers would like to get the highest wealth accumulation potential from their installment receipts. In this way, an entity can be acquired at a lower present value cost to the buyer, and at a higher rate of return to the seller. Conventional installment sale plans, however, do not provide any of these desired results.

As explained above, conventional financial plans present many drawbacks in terms of low wealth accumulation potential, unrecoverable cost, adverse tax consequences, and administrative overhead. Accordingly, it is highly desirable to find a simple plan that provides superior wealth accumulation potential for funding various transactions without the above described drawbacks. For instance, it is desirable to recover the cost of a plan offered to employees while still providing them with high quality fringe benefits and superior wealth accumulation potential.

As it will become clear from the following description, the inventor has developed a method and apparatus for processing financial data for a devised funding plan called Managed Equity Secured Opportunity Plan (herein after referred to as MESOP™) that overcomes many of the drawbacks of conventional financial plans. MESOP funding can be used in a variety of transactions involving indivduals, employers, employees, independent contractors, and executives, as well as for installment sale transactions by individuals and corporations. Using a digital computer, the data processing method and apparatus implements various aspects of MESOP funding for data analysis, forecasting, and illustration of results. Based on a set of electronically inputted assumptions, the digital computer provides formatted evaluation and forecast data in a spreadsheet format on a display device, such as a printer or a monitor.

In the past, digital computers have been used by corporations and financial institutions to perform financial data processing. For example, digital computers have been used to analyze and project cash flows, balance sheets and income statement consequences of various funding methods. In one conventional system, a digital computer compares the cash values of a life insurance to a simple arithmetic present value of OPEBs. Systems also exist that reflect the earnings effect of prefunding with Trust Owned Life Insurance (TOLI) under pay-as-you-go or accrual accounting methods. In another approach, which is disclosed in U.S. Pat. No. 5,590,037, a digital computer computes a financial projection and an illustration of a pre-funding program for an employee benefit plan. Under this system, input data representing forecast for a life insurance contract and forecast for an employee benefit are processed to generate data that includes an illustration representing the life insurance contract encumbered by an indenture agreement. The digital computer is programmed to provide financial analytical data for use in evaluating the use of the life insurance as an investment in connection with the indenture plan for prefunding benefit liabilities. None of these systems, however, teach the method and apparatus for processing MESOP financial data according to the present invention.

SUMMARY

Briefly, according to the present invention, a financial data processing method apparatus operating in a digital computer processes electronically inputted contribution data to generate output data representing results of different financial plans. The contribution data corresponds to periodic contributions to an account, which is set up to serve various financial plans, including a personal wealth accumulation plan, a deferred compensation plan, a pension plan, a stock option plan, an employee benefit plan, or a sale installment plan. The contribution data corresponds to contributions made to the account at the beginning of a plurality of accounting periods. The digital computer running a spreadsheet program processes the electronically inputted contribution data to produce data representing after tax cost of interest for loan amounts corresponding to cumulative cash values of an insurance policy issued based on the periodic contributions to the account. The digital computer then produces data representing investment income derived from the loan amounts less the after tax cost of interest. Among other things, the digital computer outputs one or more of the data representing cumulative cash values, after tax cost of interest, or investment income to a display device.

According to some of the more detailed features of the invention, the digital computer produces data representing after tax cost of interest on loan amounts corresponding to tax consequences of the periodic contributions. Under this arrangement, the investment income data represents income derived from the cash value loan amount less after tax cost of interest covering the cash value loans against cumulative cash values of the insurance contract as well the as loans that cover the tax consequences. For the deferred compensation, pension, stock option, or employee benefit plans, the digital computer also produces data representing the cost associated with providing these plans and data representing death benefit paid under the insurance policy. Under this arrangement, data representing investment income includes data representing the cost being offset by death benefit paid under the insurance policy. For the employee benefit plan, the data representing the cost includes data representing the cost of providing a high deductible health insurance policy for employees.

Other features and advantages of the present invention will become apparent from the following description of the preferred embodiment, taken in conjunction with the accompanying drawings, which illustrate, by way of example, the principles of the invention.

BRIEF DESCRIPTION OF DRAWINGS

FIGS. 7(a) and 7(b) show a procedural flow chart of events under a MESOP installment sale plan.

Figure 1:
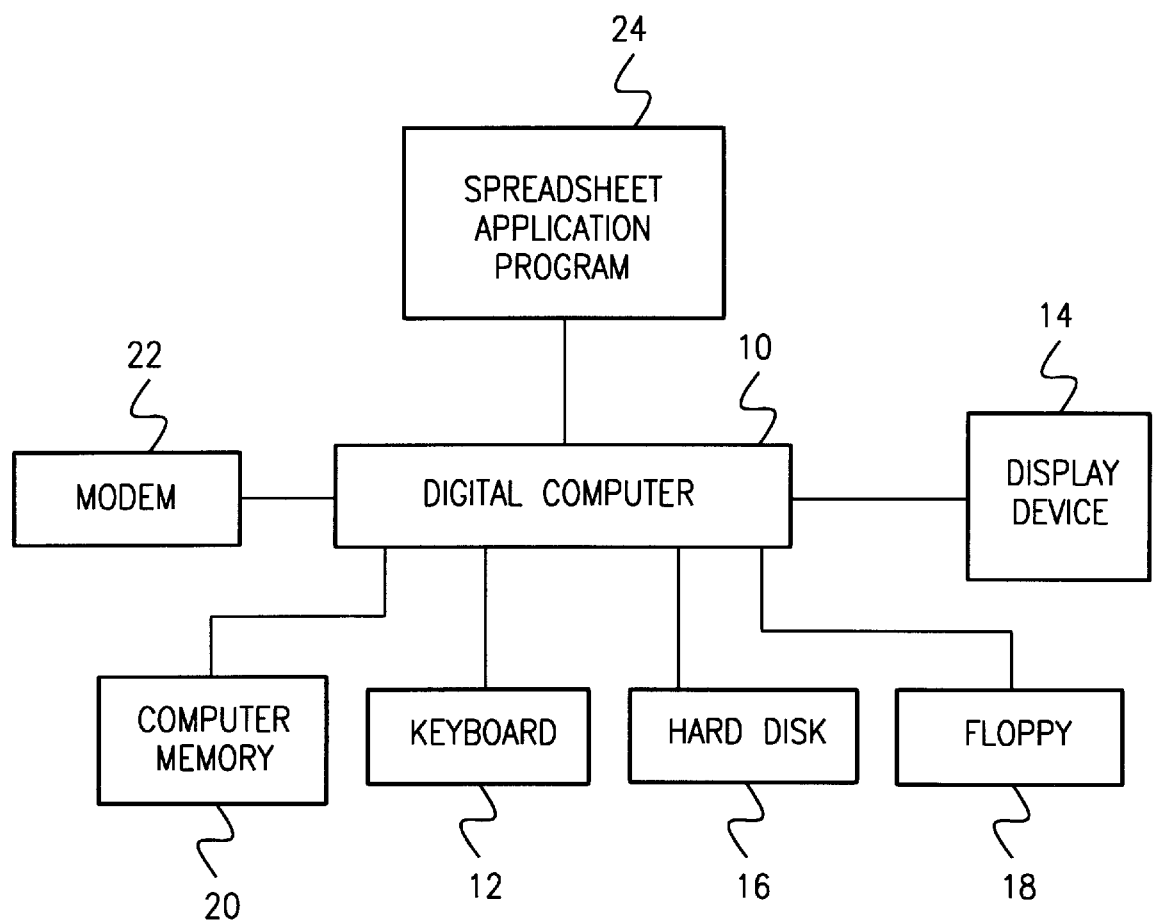
FIG. 1 is a block diagram of a digital computer implementing the data processing method and apparatus of the present invention.

Exhibits A-1 and A-2 show spreadsheet that produce financial results under a MESOP personal wealth accumulation plan and a traditional plan.

Exhibits B-1 and B-2 show spreadsheet programs that produce financial results under a MESOP deferred compensation plan and a traditional plan.

Exhibits C-1 and C-2 show spreadsheet programs that produce financial results under a MESOP pension plan and a traditional plan.

Exhibits D-1 and D-2 show spreadsheet programs that produce financial results under a MESOP stock option plan and a traditional plan.

Exhibits E-2 and E-6 show spreadsheet programs that produce financial results under a MESOP employee plan and a traditional plan.

Exhibits F-1 and F-2 show spreadsheet programs that produce financial results under a MESOP installment sale plan and a traditional plan.

DETAILED DESCRIPTION

In order to facilitate understanding of the method and apparatus for processing financial data in a digital computer in accordance with the present invention, it is necessary to explain MESOP funding. As explained in more detail below, various aspects of MESOP funding can be used for personal wealth accumulation, funding corporate deferred compensation, pension, and stock option plans, as well as group health insurance and life insurance and other employee benefits including OPEBs. Under another aspect, MESOP funding may also be used to structure installment sale transactions. All aspects of MESOP funding require periodic contributions to a MESOP account, with the contributions being used to purchase a life insurance contract on behalf of a party involved in the transaction, for example, an individual investor, employee, an independent contractor, or a seller. Preferably, the life insurance contract is a low-load, high cash-value whole-life insurance contract, for example, a life insurance contract that has an accumulated cash value equal to up to 90% of the annual premium paid by the end of first year. More particularly, the life insurance contract is designed to increase the accumulated cash value to more than the annual premium paid by the end of the third year in effect. Further, the accumulated cash value is designed to be greater than the total premiums paid by the end of the fourth year. The purchased life insurance contract also has a specified death benefit, payable to the insured's beneficiary upon insured's death.

Under MESOP funding, up to 100% of accumulated cash values of the life insurance contract are used as collateral for loan amounts. The interest due on the loans are deducted at the beginning of each accounting period, for example, at the beginning of each year. In order to generate investment capital, the life insurance contract is assigned to a financial institution as collateral in return for the loans. The proceeds of loans are used to create an investment portfolio, for example, a portfolio consisting of stocks, bonds, mutual funds, or other securities, which are in effect collateralized by the funds in the MESOP account.

Unlike other investments instruments, the accumulated cash values of a life insurance contract are tax deferred. Moreover, under Section 264 of the IRS Code, if a policy owner uses proceeds of loan against life insurance policies to buy investments that are under his or her control, rather than to pay premiums, the loan interest is tax deductible to the extent of total investment income, which includes all reported investment income. Accordingly, as the investment portfolio grows, the interest expense paid on the loans creates a tax shelter for the gains in the MESOP account. In this way, the MESOP account can be managed, preferably by a professional money manager, to create enough interest expense, for example, through investment in a margin account, that offsets capital gain and investment income tax. Consequently, the investment portfolio can grow virtually tax free, with tax-deferred compounding of the accumulative cash values of the life insurance contract being used for leverage investing.

While the portfolio is growing, the accumulated value of the MESOP account may be used to fund various purposes, such as personal needs, pension payments, health care cost, OPEB expenses, etc. Under another feature of MESOP funding, the death benefit may be used to pay off all outstanding loans as well as for cost recovery of benefits by a corporation. Further, it would be appreciated that the funds accumulated under the MESOP deferred compensation plan are outside the reach of creditors in case of bankruptcy.

It should be noted that in order to avoid characterizing the life insurance contract as an investment contract under IRS rules, which would subject MESOP plan to last-in-first-out (LIFO) accounting method, the purchased life insurance contract must have a specified loan-to-equity ratio. In order to achieve this, under an exemplary arrangement, the purchased insurance policy may have two components: a base policy component and a paid-up policy component. In this way, the contributions to MESOP account may be split to cover premiums of the two policy components by a ratio that maximizes guaranteed cash value of the contract, while maintaining its load within a suitable limit.

Referring to FIG. 1, a functional block diagram of a financial data processing method and apparatus is shown. The method and apparatus of the invention is implemented using a digital computer 10, such as an IBM-personal computer running a DOS or Windows operating system. The digital computer 10 has a keyboard 12, a display device 14, such as a monitor and/or printer. The digital computer 10 also has data storage means, including a hard disk 16, a floppy drive 18, and a computer memory 20. Optionally, the digital computer may include communication devices, such as a modem 22 for transferring input and output data over phone lines. In the preferred embodiment, the digital computer runs a application program 24, such as LOTUS 1-2-3® or EXCEL®, for processing electronically inputted data. The application program 24 produces digital output data representing financial results of MESOP funding. The digital output data is transmitted to the display device to be displayed according to a predefined spreadsheet format. As is well known, the application programs 24 allows cells of a displayed spreadsheet to be used as input or output cells. Cells may include formulas for performing various logical or arithmatic operations on variables defined within the cells. As a result, those skilled in the art can readily write a spreadsheet program that runs under the application program to implement a specific data processing function in a desired output format. It is to be understood, however, that other implementations of the present invention, such as those using a different kind of digital computer or a computer program written in a different language, are entirely acceptable and wholly equivalent.

The digital computer 10 processes a distinct number of electronically inputted data. The input data may be entered via the keyboard 12, or read from the disk 16, or obtained from a source via the communication device 22. For data processing method and apparatus of the present invention, the electronically inputted data include biographic information, insurance information, tax information, investment return information, and loan information. Among other things, the biographic data consist of an individual's current and retirement ages, expected withdrawal at retirement, and salary. The tax information consists of individual tax bracket as well as corporate tax bracket. The investment return information consists of a rate of return on investment and a present value rate. Loan information include interest rates charged for loans by a financial institution, such as a bank, insurance company, or the rate charged for loans by a corporation. The contribution information consists of information on amounts contributed to MESOP account, for example, by an individual, a corporation, employee, or a buyer. The insurance information, which are usually obtained from an insurance company, consists of premium amounts, death benefits, and annual cash values of a life insurance contract.

Figure 2:
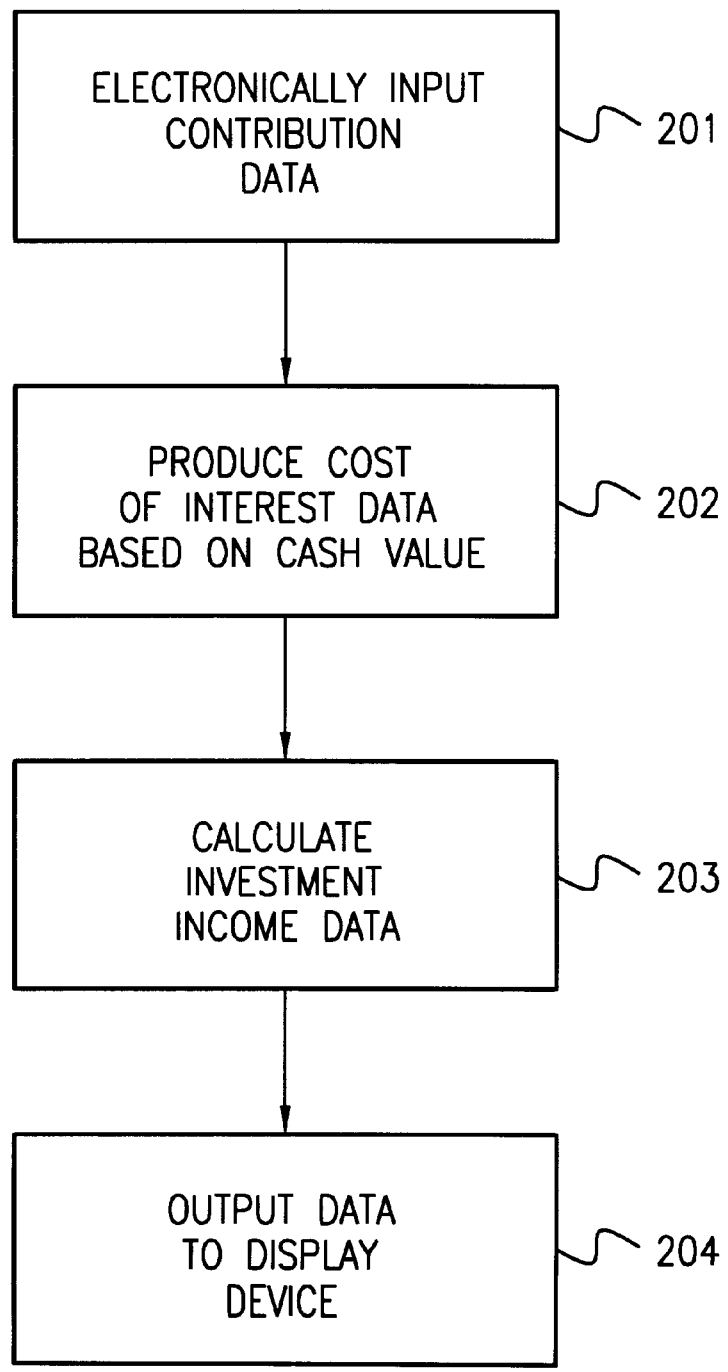
FIG. 2 is a flow chart of steps taken under one aspect of the present invention.

Referring to FIG. 2, a flow chart of steps taken to process financial data according to one aspect of the invention is shown. According to this aspect, input data corresponding to periodic contributions to MESOP account at the beginning of a plurality of accounting periods are electronically entered into the digital computer 10, block 201. The digital computer 10 running the spreadsheet program 24 processes the electronically inputted data to produce digital data representing after tax cost of interest based on loan amounts made on cumulative cash values of the insurance contract, block 202. The digital computer 10 then calculates data representing investment income derived from the loans less the after tax cost of interest, block 203. The digital computer outputs digital data representing the cumulative cash values, after tax cost of interest, or investment income to the display device 14, block 204.

Figure 3:
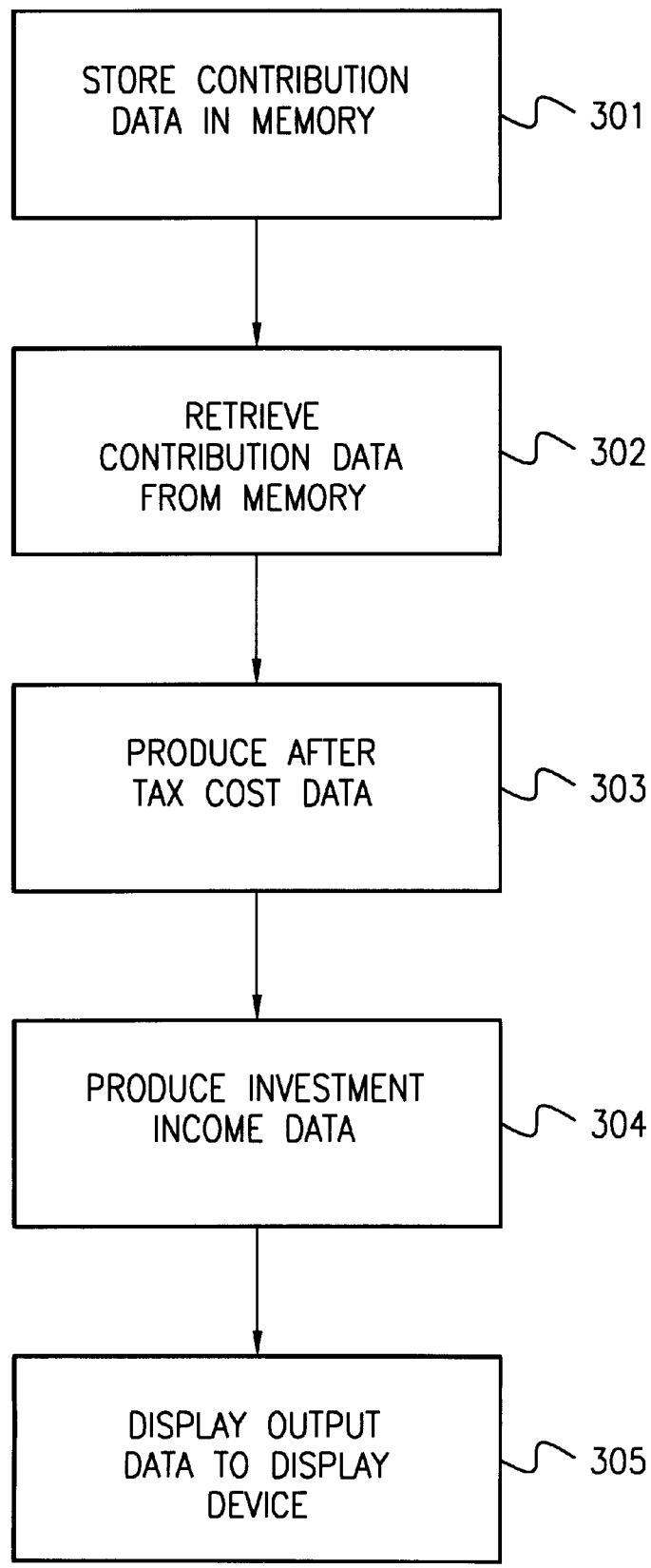
FIG. 3 is a flow chart of steps taken under another aspect of the invention.

FIG. 3 shows a flow chart of steps according to another aspect of the invention. Under this aspect, a method for processing financial data in the digital computer 10 stores the input data corresponding to the periodic contributions in the computer memory 20, block 301. The digital computer retrieves the input data from the computer memory to produce the after tax cost of the loan amounts, blocks 302 and 303. Finally, the digital computer outputs digital data representing investment income derived from the loans made based on the cumulative cash values of the insurance policy less after tax cost of interest on the loans to the display device 14, block 304 and 305.

In the following sections, various aspects of MESOP funding for various plans are described. These aspects cover MESOP personal wealth accumulation plan, MESOP deferred compensation, pension and stock option plans, MESOP employee benefit plans, and MESOP installment sale plan. For each MESOP plan, exemplary Tables illustrating financial results are shown at the end of the specification. These Tables are produced by the digital computer 10 running an EXCEL® application program.

MESOP Personal Wealth Accumulation Plan

Figure 4A:
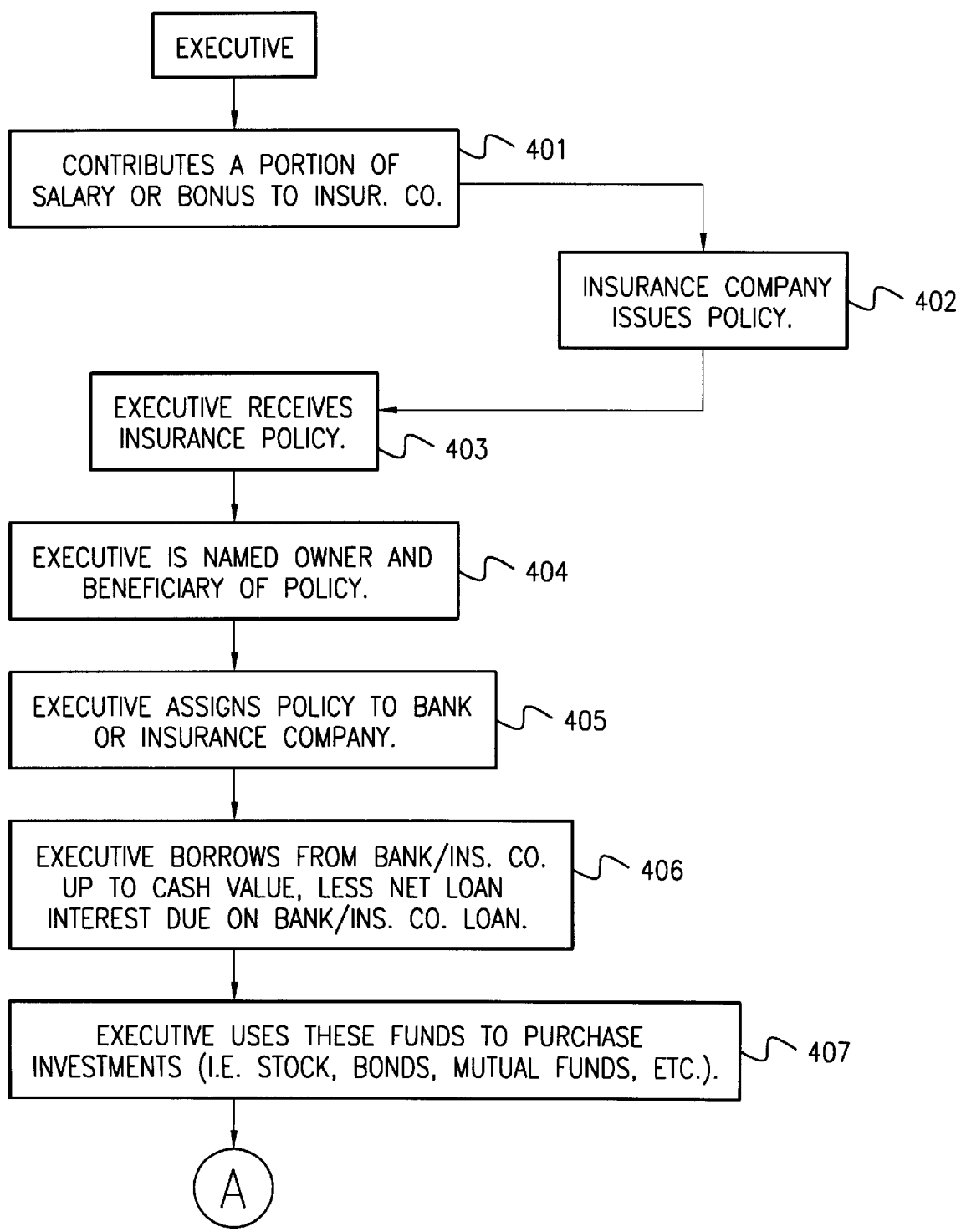
FIGS. 4(a) and 4(b) show a procedural flow chart of events under a MESOP personal wealth accumulation plan.
Figure 4B:
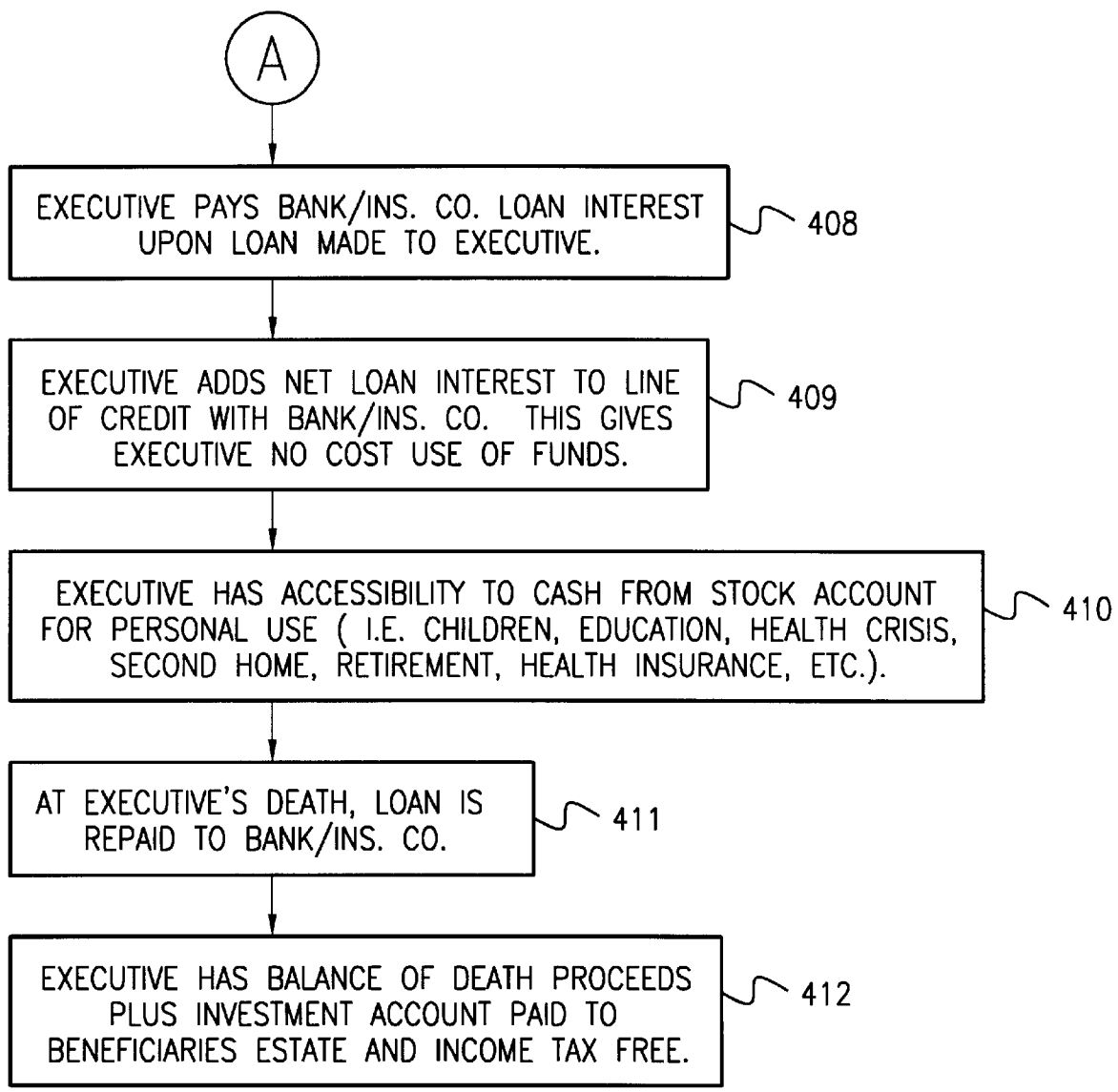

In its simplest aspect, MESOP funding can be used for personal wealth accumulation. Referring to FIGS. 4(a) and 4(b), a procedural flow chart of events under MESOP personal wealth accumulation plan are shown. It is assumed that the individual accumulating personal wealth is a high income executive. At the beginning of each accounting period, for example, each year, the executive contributes an after tax portion of his or her salary or bonus to a MESOP personal account, block 401. The contribution is used to purchase, from an insurance company, a low-load, high-cash-value whole life insurance contract with a specified death benefit. As explained above, the life insurance contract is designed to meet a suitable load-to-equity ratio. Once premium is paid, the insurance company issues the life insurance contract naming the executive the owner and beneficiary, blocks 402, 403, and 404.

In order to generate investment funds, the executive then assigns the life insurance contract to a financial institution, for example, a bank or the issuing insurance company itself. In return, the executive receives loans in amounts equal to the cash value of the insurance contract, less net loan interests due on the loans, block 406. Preferably, the financial institution has agreed to make loans to the executive of up to 100% of accumulated cash values by taking assignment of the life insurance contract. Then, the executive uses the proceeds of the loans to create an investment portfolio, for example, a portfolio consisting of stocks, bonds, mutual fund, or other securities, block 407. In order to qualify for the interest expense deduction under Section 264 of the IRS Code, the executive pays loan interest due on a prior year loan from the accumulated cash value, block 408. Once the loan interest is paid, the executive obtains a loan equal to 100% of the cash value increase for that year less the after tax cost of interest on the loan. As a result, the executive adds the loan interest to the loan balance and invests the remaining cash value proceeds in the investment portfolio, effectively receiving a no cost loan, block 409.

As the investment portfolio grows, the interest expense paid on the loans creates a tax shelter for the gains in the investment portfolio. In this way, MESOP personal account can be managed to create enough interest expense, for example, through margin account investing, to offset capital gains and investment income taxes. As illustrated later, by the time the life insurance contract is in effect for 4 years, its cash value would increase to be more than the annual premium and would continue to increase substantially thereafter. Because the financial institution has agreed to loan up to 100% of the cash value, the executive will have more funds to invest in the investment portfolio than if he or she had invested in a conventional investment account.

In the meantime, the executive has tax free access to funds in MESOP personal account, block 410. The executive may use the funds in MESOP personal account for any purpose, such as for children education, retirement, health insurance, etc. Upon executive's death, the death benefit of the life insurance contract is used to pay off all outstanding loans, block 411. After the loans are paid off, the executive's balance of death proceeds plus the value of the investment portfolio are paid to executive's estate income tax free, block 412.

An exemplary spreadsheet produced by the financial data processing method and apparatus that illustrates financial results of MESOP personal wealth accumulation plan is shown by Table A-1. The spreadsheet program that produces Table A-1 is shown in Exhibit A-1. In a well known manner, biographic data including executive's age, retirement age, and expected withdrawal on retirement are inputted electronically into designated biographic data cells of the spreadsheet program. Also, electronically inputted are tax information, including executive's tax bracket and capital gains rate, interest rate information, including rate on bank loans, and investment information, including net growth rate, net dividend income rate, and total investment earning rate, and contribution information reflecting annual amount invested in MESOP personal account. The electronically inputted data may be actual or assumptions of a user, which are displayed on top of Table A-1.

For the example illustrated by Table A-1, it is assumed that a 45-year old executive in a 40% tax bracket annually contributes $100,000 to MESOP personal account for 20 years between the ages of 45 and 65. Upon retirement at age 65, the executive is assumed to withdraw $710,000 annually. As shown, the capital gain rate is assumed to be 20%. Rate on bank loans is assumed to be 7%, and total net investment earning to be 12%, representing a 9% net growth rate plus a 3% net dividend income.

Rows 1–40 show the resulting outputs of the plan for variables represented by columns 1–15. The digital computer 10 running the spreadsheet program of Exhibit A-1 electronically processes the inputted data to produce digital data representing executive contributions of $100,000 for 20 years in Column 3. Columns 4 and 5 show annual increase and cumulative cash values of the life insurance contract. In Column 6, the spreadsheet program calculates interest due on loans at 7%. Based on the assumption that interest due on bank loans are tax deductible, which for the executive's 40% tax bracket, a net after tax interest rate of 4.2% is used. Columns 7 and 8 show executive withdrawal from a margin account after age 65 and calculated net after tax cost of interest on these margin loans, respectively. In Column 9, the spreadsheet program produces data representing the total after tax cost of interest, which, for each year, is equal to sum of corresponding values of Columns 6 and 8.

In column 10, the spreadsheet program produces data representing annual investments into the investment portfolio, which, for each year, are equal to the difference of the cumulative cash values (shown in Column 4) and the total after tax cost of interest (shown in Column 9). In Column 11, the spreadsheet program produces data representing the total fund in the investment portfolio based on the assumed investment return of 12%. Additionally, the spreadsheet program causes the digital computer to produce digital data representing the rates of investement return needed in each year to offset the interest expense in Column 12. In Columns 13 and 14, the digital computer produces cumulative amount of margin debt against equity and death benefit paid income, respectively. Finally, in Column 15, the spreadsheet program produces digital data representing the total asset accumulated at the death of the executive, which, for each year, is equal to the sum of the values of Columns 11 and 14 minus the value of Column 13.

Another exemplary spreadsheet shown by Table A-2, illustrates data corresponding to a traditional personal wealth accumulation method. The spreadsheet program that produces Table A-2 is shown in Exhibit A-2. Table A-3 compares MESOP personal wealth accumulation plan to the traditional personal wealth accumulation plan. Based on the above assumptions, Table A-1 illustrates that the capital in the investment portfolio of MESOP personal wealth accumulation plan can grow to a sizable amount. Table A-1 also illustrates the amount of funds the executive can choose to receive on tax free margin loans from the portfolio, for example, to replace income that was earned while employed. According to the illustrations of Tables A-2 and A-3, under the traditional personal wealth accumulation plan, the executive would deduct the applicable income tax on any dividends along with any applicable capital gains tax upon a portfolio sale. With the MESOP personal wealth accumulation plan, however, the executive receives all income without tax liability and the sheltering provided by the interest expense allows all dividends and portfolio to grow tax free, when the dividends are reinvested. Also illustrated is that, at the time of the death of the executive (assuming age 85), the executive and/or the executive's estate will receive almost six times as much income with the MESOP personal wealth accumulation plan than with a traditional personal wealth accumulation plan.

MESOP Deferred Compensation, Pension and Stock Option Plans.

Figure 5A:
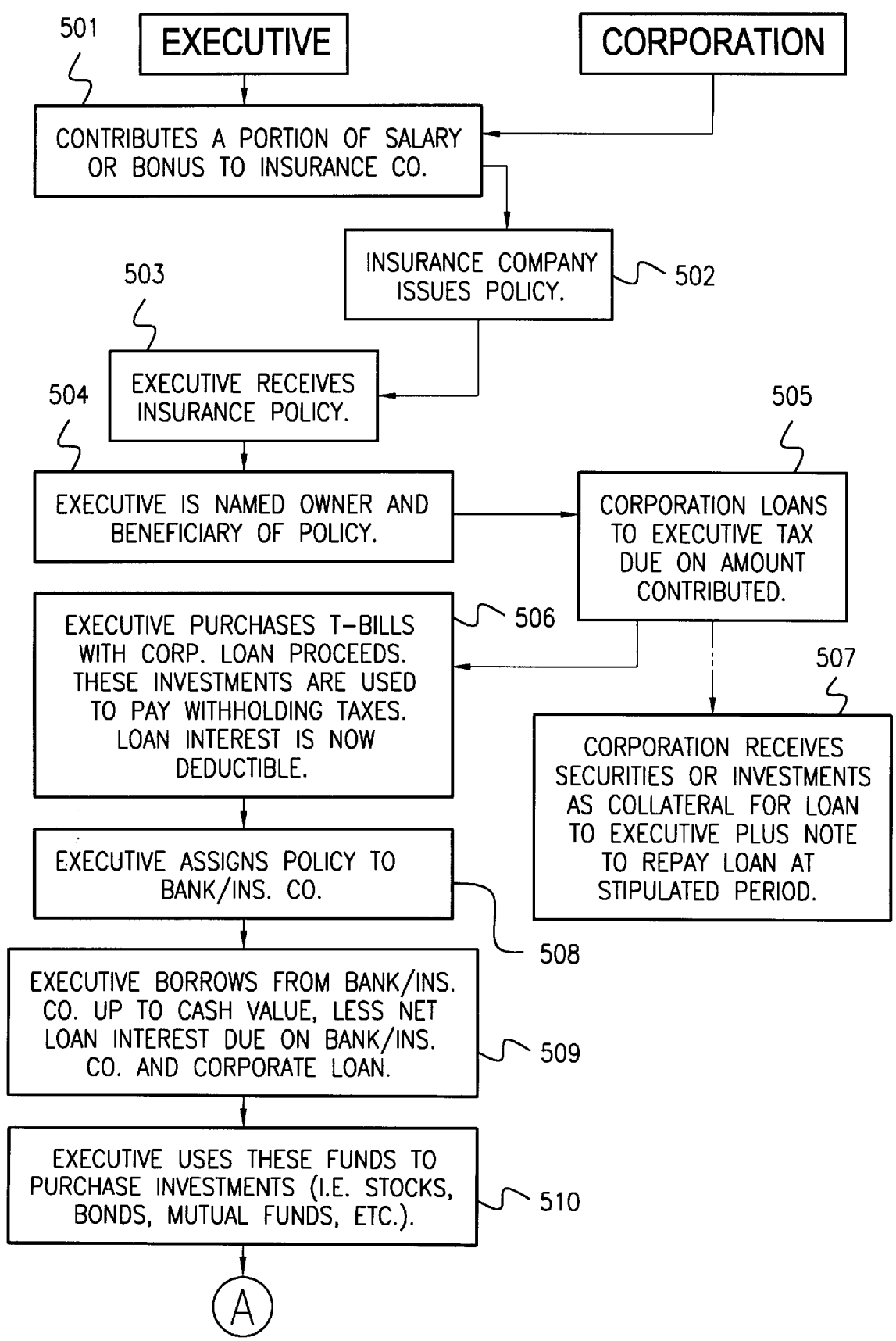
FIGS. 5(a) and 5(b) show a procedural flow chart of events under a MESOP deferred compensation plan.
Figure 5B:
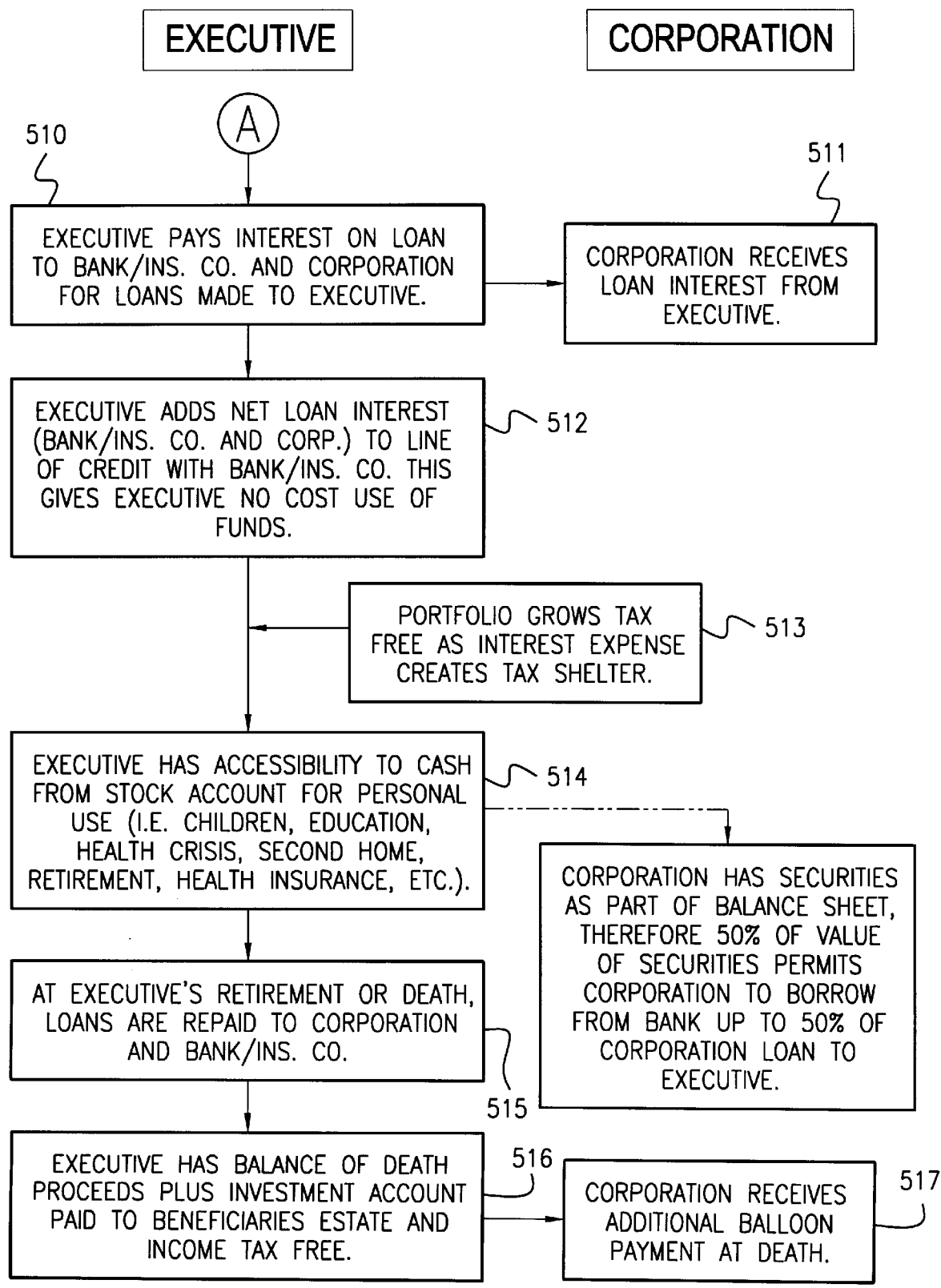

Under another aspect of MESOP funding, a corporation may use MESOP accounts to fund deferred compensation, pension, or stock option plans for its employees, for example an executive. Referring to FIGS. 5(a) and 5(b), a procedural flow chart of events under MESOP deferred compensation plan is shown. Slightly modified events also apply under a MESOP pension plan or a MESOP stock option plan. In this description, MESOP deferred compensation plan is fully described. For MESOP stock option and pension plans, however, the resulting outputs under a corresponding spreadsheet program are described.

As shown, at the beginning of each accounting period, the corporation and/or executive contribute to a MESOP deferred compensation account, block 501. For example, corporate contributions may be in the form of periodic bonuses, and executive contributions may be in the form of periodic salary deductions. With the proceed of the periodic contributions, the corporation purchases a low load, high cash value life insurance contract with a specified death benefit having a suitable load-to-equity ratio. When paid, the insurance company issues the life insurance contract, naming the executive as the owner and beneficiary, blocks 502, 503, and 504.

Since MESOP deferred compensation plan does not meet IRS's qualified plan requirements, the corporate contributions are taxable income to the executive. Under this aspect of MESOP funding, at the beginning of each accounting period, the corporation loans to the executive an amount equal to tax due on the corporate contributions, block 505. For the loans, for which the corporation obtains a note from the executive to repay it within a specified time. Because investment interest expense is tax deductible up to the amount of total investment income, the corporate loan is preferably invested in a short term investment portfolio, such as a portfolio consisting of 30-day to 360-day Treasury Bills, block 506. In this way, the executive deducts the interest expense of the corporate loan. In addition, the executive can assign, as collateral, the short term investment portfolio to the corporation, thereby enabling the corporation to report the collateralized corporate loan as corporate assets under the Generally Accepted Accounting Principals (GAAP), block 507.

The executive then assigns the life insurance contract in return for loans of up to 100% of the accumulated cash value of the insurance contract from a financial institution, such as a bank, which may take the assignment as collateral for the loans, block 508. In order to guarantee full collaterization with the financial institution, the net loan interest due on the financial institution loan is deducted from the amount of the loan, with the remaining proceeds being invested in an investment portfolio that includes stocks, bonds, mutual fund, or other securities, blocks 509 and 510. Under MESOP stock option plan, the executive may use the portfolio funds to purchase corporate shares.

At the beginning of each accounting period, the executive pays the interest expense due on the corporate and financial institution loans with subsequent loans made based on the accumulated cash values of the life insurance contract, blocks 510 and 511. It would be appreciated that because the interest expenses of the bank and financial institution loans are deducted from the loans, the interest expenses are added to the line of credit with the financial institution, effectively creating a no-cost use of capital to the executive, block 512. As explained above, because the interest expense paid on loans from the financial institution and corporation are tax deductible, the portfolio can be managed to create enough interest expense that offsets capital gain and investment income taxes. Thus, unlike traditional qualified plans, the portfolio can grow virtually tax free with executive having unrestricted access to funds before retirement, without tax liability or penalty, block 513. Furthermore, under MESOP deferred compensation, no government compliance is needed, which minimizes administrative overhead.

Upon retirement, the executive may use the funds accumulated in the investment portfolio for personal use or to pay off the outstanding corporate and financial institution loans by, withdrawing against a margin account created under MESOP account, block 514. For example, similar to an annuity, the executive may periodically withdraw an specified amount from the margin account. Upon executive's death, the outstanding value of the investment portfolio is used to pay off the outstanding loans, with remainder being conveyed to executive's estate, block 516. In order to recover the cost of deferred compensation plan, the corporation may require the executive to assign a portion of the death benefits to be paid to the corporation as a balloon payment. Consequently, the corporation may recover the cost of providing the MESOP plan or even show a gain for providing the plan, block 517.

An exemplary spreadsheet produced by the financial data processing method and apparatus that implements MESOP deferred compensation plan is shown by Tables B-1 and B'-1. Tables B-1 and B'-1, which are separated from each other for clarity, include rows 1–40 and columns 1–21, with Columns 1–7 being shown by Table B-1 and Columns 8–21 being shown by Table B'-1. A spreadsheet program that produces Tables B-1 and B'-1 is shown in Exhibit B-1. Under this aspect, Table B-1 represents data corresponding to financial results of MESOP deferred compensation plan to the corporation, and Table B'-1 represents data corresponding to financial results of the plan to the executive. The input data representing an exemplary assumptions are shown on top of Table B'-1. For the example illustrated in Tables B-1 and B'-1, it is assumed that a 45 years old executive in a 40% tax bracket will contribute $100,000 to MESOP deferred compensation plan for 20 years, between ages of 45 and 65. Upon retirement at the age of 65, the executive is assumed to be withdrawing $578,778 annually. As shown, the capital gain rate is assumed to be 20%. Rate on financial institution and corporate loans is assumed to be 7%, and the total net investment earning rate is assumed to be 12%, representing 9% net growth rate plus 3% net dividend income rate. The corporate tax bracket under this example is assumed to be 40%.

Similar to Table A-1, rows 1–40 of Table B-1 represent the yearly results of MESOP deferred compensation plan For 40 years. Except for Column 12 of Table B'-1, the explanations for other columns of Table B'-1, which represent results of the MESOP plan to the executive, are substantially similar to the explanations given for corresponding Columns of Table A-1, therefore, they are not repeated. Column 12 of Table B'-1 represents the interest due on the corporate loan to the executive for each year. With respect to corporate results, in Column 3, the spreadsheet program produces digital data representing annual corporate loans made to the executive for payment of tax on the corporate contributions. The spreadsheet program produces digital data representing the cumulative corporate loans repaid upon the death of executive in Column 4. In Column 5, based on a 40% corporate tax bracket, the digital computer calculates interest income at 4.2% net after tax rate for each year. Column 6 shows the balloon payments to the corporation from executive's death benefit should the executive die, and Column 7 of Table B-1 shows the cash flow incurred by the corporation for providing MESOP deferred compensation plan.

Another exemplary spreadsheet shown by Table B-2 illustrates the results of a traditional deferred compensation plan. The spreadsheet program that produces Table B-2 is shown in Exhibit B-2. Table B-3 compares the results of wealth accumulation and corporate cost or gain under MESOP deferred compensation plan versus the traditional plan. Tables B-1, B'-1, and B-2 illustrate that under MESOP deferred compensation plan, the executive's estate upon his or her death at age 85 will receive almost 5 times more income with MESOP deferred compensation plan than with the traditional deferred compensation plan. Tables also illustrate that MESOP deferred compensation plan can actually create income for the corporation, whereas, with a traditional deferred compensation plan, the corporation's cost depends upon earnings and other factors. This is because the corporation receives a balloon payment from the executive at a specified period that is above and beyond the interest payments and corporate loan repayment. According to illustrations of the above example, the corporation could receive an amount between $800,000 to $1,600,000 of pre-tax income from the executive, even though the financial results of MESOP deferred compensation plan to the executive are much better than the traditional method.

Similar to MESOP deferred compensation plan, exemplary spreadsheets produced by the the digital computer that implements MESOP pension plan is shown by Tables C-1 and C'-1. Table C-2 shows the results of a traditional qualified pension plan. These Tables are produced by spreadsheet programs shown in Exhibits C-1 and C-2. Table C-3 shows a comparison of the results of MESOP pension plan versus the traditional qualified pension plan. These Tables illustrate that under MESOP pension plan, at the time of the death of the executive (assuming that death occurs at age 85), the executive's estate could receive almost six times as much income with the MESOP pension plan than with the traditional qualified pension plan. These Tables also illustrate that unlike traditional pension plans, MESOP pension plan can actually create income, when the corporation receives a balloon payment from the executive at the end of the specified period. Based on the assumption shown on top of Table C'-1, the corporation could receive an amount between $1,200,000 to $2,400,000 of pre-tax income from the executive.

Exemplary spreadsheets produced by the financial data processing method and apparatus that implements MESOP stock option plan are shown by Tables D-1 and D'-1. Table D-2 shows the results of a traditional stock option plan. These Tables are produced by spreadsheet programs shown in Exhibits D-1 and D-2. Table D-3 shows a comparison of the results of MESOP stock option plan versus a traditional stock option plan. Based on assumption shown on top of Table D'-1, Tables produced for MESOP stock option plan illustrate that at the time of the death of the executive (assuming death occurs at age 80), the executive's estate receives $13 million. It is also illustrated that with MESOP stock option plan, the corporation incurs no present value cost (when present valued at 7%), after receiving the balloon payments. Moreover, it is illustrated that under MESOP stock option plan, the corporate loans are paid off when the executive reaches the age of 65, whereas when a similar balloon payment is made under the traditional stock option plan, the executives portfolio is diminished entirely.

MESOP Group Health, Life and OPEB Plan.

Under another arrangement, a corporation may use another aspect of MESOP funding for providing a group health and life insurance as well as OPEB plan to its employees. Under this plan, the corporation purchases low-cost, high-deductible health insurance policies to provide catastrophic health coverage for its employees. The cost not covered by the catastrophic health insurance policy, is funded by MESOP group employee accounts that self insure the employees against costs below the deductible. Similar to other aspects of MESOP funding, the corporate contributions to MESOP employee benefit accounts are used to purchase life insurance contracts on behalf of the employees. Loans proceeds on the cash values of the life insurance contracts fund a tax free investment portfolio that pays for the cost of health care not covered by the deductible. Moreover, investment portfolio assets can be used to provide life insurance coverage and OPEB, i.e., post 65, benefits to the employees. The death benefits are partially assigned to the corporation for cost recovery of the benefits via balloon payments made upon employees' death.

Figure 6A:
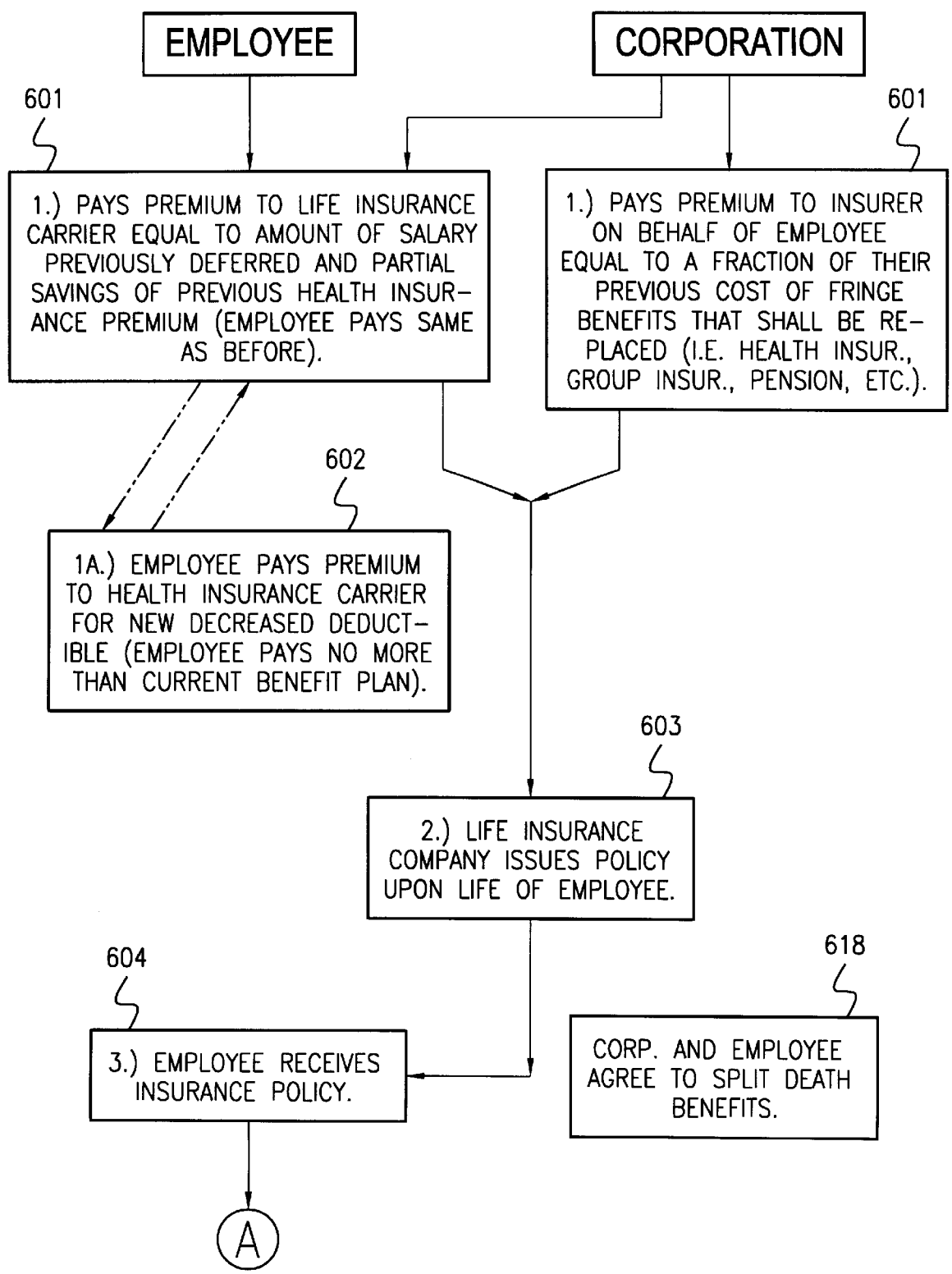
FIGS. 6(a), 6(b) and 6(c) show a procedural flow chart of events under a MESOP employee benefit plan.
Figure 6B:
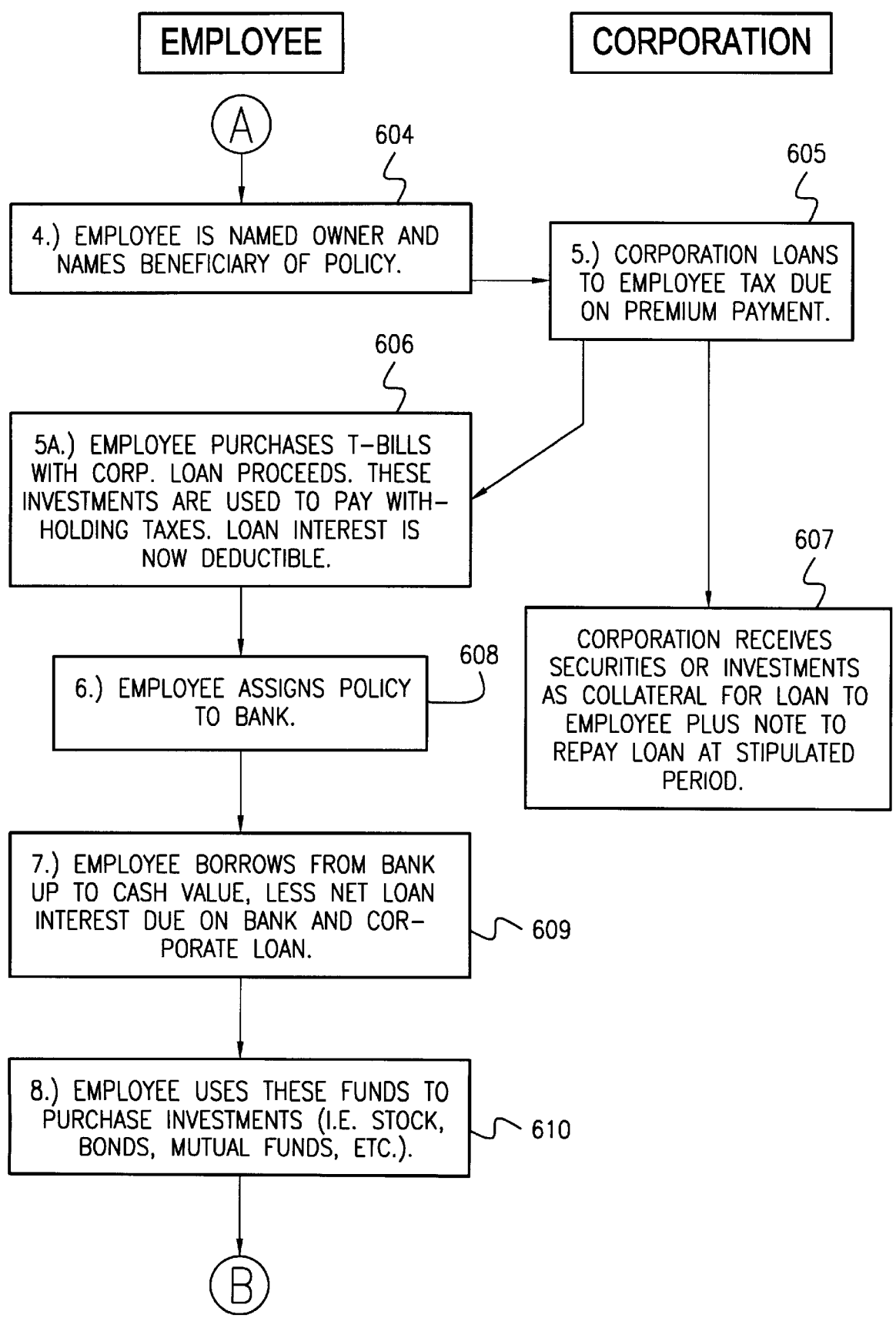
Figure 6C:
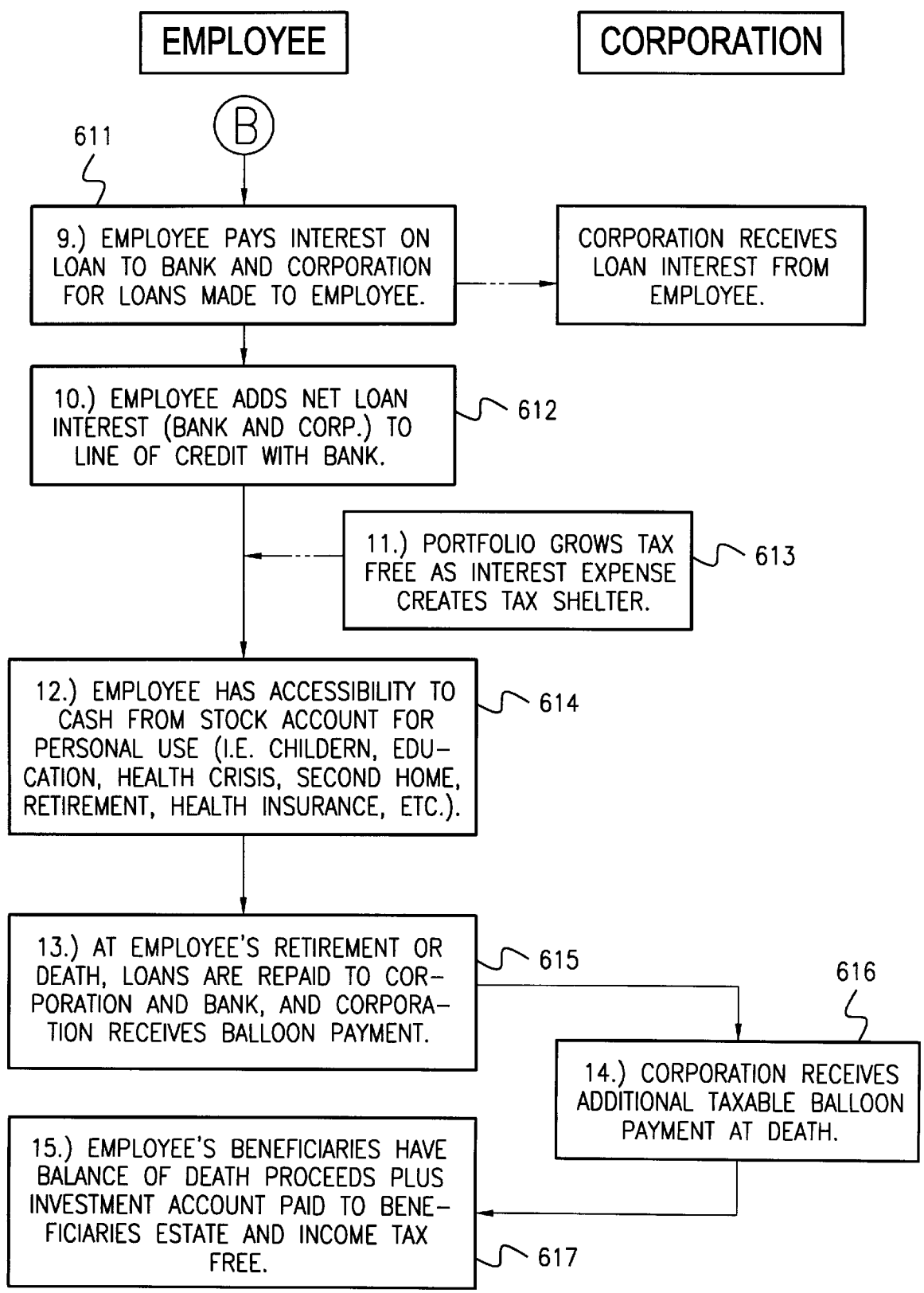

Referring to FIGS. 6($a$), 6($b$), and 6($c$), a procedural flow chart of events under MESOP employee benefit plan is shown. MESOP employee benefit accounts are funded by employees or corporate contributions or a combination thereof, block 601. The corporation may make contributions on behalf of its employees as a tax deductible contribution into the MESOP employee benefits accounts. With account proceeds, a high deductible, for example $5000, group health insurance is purchased, thereby substantially reducing the cost insurance premium, block 602. With the remaining funds in MESOP employee benefit accounts, each employee pays for premiums of a low load, high cash value life insurance contract that meets the criteria against being characterized an investment contract under IRS rules. When paid, an insurance company issues life insurance contracts, naming the employees owners and beneficiaries thereof, blocks 603 and 604. The purchased life insurance contracts also offer death benefits, payable to insured employees' beneficiaries upon their death.

Preferably, the corporation enters into an agreement with its employees to split employees death benefits, when an employee dies, block 618. In this way, the corporation can recover the cost of providing these benefits to its employees. This is because for a large employee group, some employees are actuarially projected to die each year. Upon the death of each insured employee, the corporation receives an agreed portion of employees death benefit, block 616. The employee death benefits received by the corporation, which have a present cash value, can be reported as corporate assets under the GAAP.

Since the MESOP employee accounts do not meet the requirements for qualified plans, all corporate contributions to MESOP employee benefit accounts are taxable income to the employees. Preferably, the corporation loans to its employees an amount equal to tax due on the corporate contributions, block 605. Similar to other aspects of MESOP funding, the corporate loans are invested in short term investment portfolios, which are used to pay taxes on corporate contributions when due, block 606. As investment interest expense is tax deductible, the purchase of the short term securities allows the employees to deduct the interest expense on corporate loan as investment interest expense up to the amount of employee's reported investment income. In addition to signing notes to repay corporate loans, the corporation may also use the short term investment portfolios of the employees as collateral for corporate loans, block 607. In this way, the corporation can report the corporate loans as corporate assets under the GAAP.

Under a pre-arranged agreement between the corporation and one or more financial institutions, the employees assign their life insurance contracts as collateral for loans of up to 100% of the total cash values, less net loan interests due on financial institution loans, blocks 608 and 609. Again, the employees invest the proceeds of the loans in investment portfolios consisting of stocks, bonds, mutual fund, or other securities, block 610. At the beginning of each accounting period, the employees pay interest due on the financial institution and corporate loans, block 611. The interest expenses due on these loans are deducted from the financial institution loans, effectively adding interest expenses to the line of credit, block 612. As explained above, the interest expense paid on loans from the financial institution and corporation are tax deductible up to the amount of reported investments income, which creates a tax shelter for the growth of portfolio assets. As a result, the fund can be managed to create enough interest expense that offsets capital gain and investment income taxes. Thus, the portfolio can grow virtually tax free, block 613. Under this arrangement, an employee can use its cash access to his or her investment portfolio to fund health care cost not covered by the high-deductible health insurance policy as well life insurance and OPEB costs, block 614. Upon employees death, balloon payments from death benefits can be used to recover the cost of providing the employee benefits, blocks 615, 616 and 617.

In order to illustrate the financial data processing method and apparatus that implements MESOP employee benefit plan, an exemplary set of assumptions for a corporation that provides employee benefits for 100 employees is shown in Table E-1. In this example, the cost of a current health insurance plan is compared to MESOP group health and life insurance plan in Table E-2. The spreadsheet program that produces Table E-2 is shown in Exhibit E-2. Input data representing the exemplary assumptions for current and MESOP employee benefit plans are shown on top of Table E-2. In Columns 3–8, Table E-2 represents data corresponding to financial results of the current plan. Column 8 shows the total cost of the current health benefits to the corporation. In Columns 8–16, Table E-2 represents data corresponding to financial results of MESOP employee benefit plan with Columns 15 and 16 the total after tax savings of MESOP plan to the corporation.

Tables E-3 and E-4 represent financial results to the corporation benefit under MESOP employee plan to the corporation for one employee and for all employees, respectively. Table E-4 also incorporate a projected mortality rate for the employees. Spreadsheet programs that are executable by the digital computer are shown in Exhibits E-3 and E-4. Table E-5 represents financial results to an employee under the MESOP employee benefit plan. Table E-6 represents financial results to an employee under a traditional employee retirement plan. Exhibits E-5 and E-6 show the spreadsheet programs that produced Tables E-5 and E-6, respectively.

Table E-7 shows summary of results to employee and corporation under traditional and MESOP plans. Among other things, the spreadsheets produced by the digital computer illustrate that the overall cost of the traditional plan at the first year and until employees reaches age 65 is $408,000 and $15,740,452, respectively. In comparison, the spreadsheets illustrate that the cost under MESOP employee plan after the first year is only $294,599, with the corporation showing a gain of $28,487,597, when employees reach 65.

MESOP Installment Sale Plan

Under yet another arrangement, a seller and a buyer may use another aspect of MESOP funding method to fund an installment sale transaction. Referring to FIGS. 7(*a*) and 7(*b*), a procedural flow chart of events under MESOP installment sale plan are shown. Similar to payments made under a traditional installment sale plan, the buyer periodically contributes a specified amount over a predefined period to an MESOP installment sale account, block 701. The fund in MESOP installment sale account is used to purchase a life insurance contract naming the seller (or sellers) the owner and beneficiary, with death benefit payable to a seller designated beneficiary, block 702. The purchased life insurance contract is a low-load, high cash value life insurance contract that meets the criteria against being characterized as an investment contract under IRS rules. The seller is named the owner and beneficiary of the life insurance contract, blocks 703 and 704.

As the premium paid is tax deductible to the buyer against ordinary income, the after tax is a fraction of the actual premium payment. (Note: Depending upon the structuring of the particular purchase, the installments may have various income tax ramifications. Here, it is assumed that all payments made will be ordinary income to the seller). As the buyer's contribution on behalf of the seller is considered ordinary income to the seller, the seller must pay tax upon the amount contributed into MESOP installment sale account. Therefore, the buyer loans the seller the tax due on premium contributions, charging the seller a specified interest rate on the loan, block 705.

As all yearly interest paid by the seller on the loan from the buyer would not be deductible, the seller does not directly use these loan funds to pay the income tax due. Instead, the seller uses the loan proceeds to invest in short term securities, block 706. The seller assigns the securities back to the buyer to allow the buyer to pay the income tax due on contributions to MESOP installment sale account, block 707. The purchasing of short term securities allows the seller to deduct the loan interest due the buyer as investment interest up to the amount of seller's reported investment income. The seller assigns the life insurance contract to a financial institution, and borrows against the accumulated cash value, blocks 708 and 709. Using this equity, the seller purchases an investment portfolio, block 710. As time moves forward, the buyer's payments and the loans for the tax due upon these contributions made to the seller are repeated yearly. The seller will also pay the yearly interest upon the outstanding buyer and financial institution loans as they become due, adding net loan interest to the line of credit, blocks 711, 712 and 713.

As the investment portfolio grows tax free, block 714, the seller has access to funds for personal use by, for example, withdrawing against a margin account created under MESOP installment sale account, block 715. Also, upon retirement, the seller may use the funds accumulated in the investment portfolio for personal use or to pay off all outstanding financial institution and buyer loans, block 716. Upon seller's death, the outstanding value of the investment portfolio is used to pay off the outstanding loans, with remainder being conveyed to executive's estate, block 717. Buyer may also require the seller to assign a portion of the death benefits to be paid to the buyer as a balloon payment, block 718.

Exemplary spreadsheets produced by the the digital computer that implements MESOP installment sale plan are shown by Tables F-1 and F'-1. Tables F-1 and F'-1, which are separated from each other for clarity, include rows 1–31 and columns 1–9, with Columns 1–8 being shown by Table F-1 and Columns 9–19 being shown by Table F'-1. A spreadsheet program executable by the digital computer 10 for producing Tables F-1 and F'-1 is shown in Exhibit F-1. Under this aspect, the spreadsheet of Table F-1 represents data corresponding to financial results of MESOP installment plan to the buyer, and Table F'-1 represents data corresponding to financial results of the plan to the seller. Another exemplary spreadsheet shown by Table F-2 illustrates the results of a traditional installment sale plan. The spreadsheet program that produces Table F-2 is shown in Exhibit F-2. Table F-3 compares the results of MESOP installment sale plan to a traditional installment sale plan.

The input data representing an exemplary assumptions are shown on top of Table F'-1. For the example illustrated in Tables F-1 and F'-1, it is assumed that a 50-year old seller with a planned retirement age of 65, who is in a 43% tax bracket, sells an investment property valued at $1.6 million in seven yearly installments of $228,571, between the seller's ages of 50 and 57. The buyer is assumed to be at a 40% tax bracket. Rates on financial institution and buyer loans are assumed to be 8.5% and 7%, respectively. The total net investment earning rate is assumed to be at at 10%, representing in 8% net growth rate plus 2% net dividend income rate. Because no tax sheltering is created via the traditional installment sale plan, therefore, ordinary income tax must be paid upon the 2% dividend income and a long term capital gains tax must be paid upon any sale. Therefore, the 2% dividend after payment of a 43% income tax by the seller is reduced to 1.1% net. Furthermore, the 8% growth rate, after a 20% capital gain tax reduces the growth to 6.4% net. Consequently, as shown on top of Table F-2, the traditional installment sale plan grows at 7.5% net rate. Rows 1–31 of Table F-1 represent the yearly results of the MESOP installment sale plan for 31 years.

With respect to the buyer, in Column 3 of Table F-1, the spreadsheet produces digital data representing annual after tax paid by the buyer for the seller. Column 4 shows the annual loan to the seller to pay tax on premium. The spreadsheet program produces digital data representing the cumulative buyers loans repaid at age 65 in Column 5 of Table F-1. In Column 6 of Table F-1, based on a 4.2% after tax rate, the digital computer calculates interest income of the buyer for each year. Column 6 of Table F-1 shows the balloon payments from seller's death benefit to the buyer should the seller die, and Column 8 of Table F-1 shows the cash flow incurred by the buyer using the MESOP installment plan. Column 9 of Table F'-1 shows the total annual amount invested by the seller in the investment portfolio. The description of Columns 10–19, which relate to the life insurance contract, are similar to those described above.

The Tables produced by the digital computer under MESOP installment sale plan illustrate that at the time of the death of the seller (assuming death occurs at age 81), the seller's estate will receive an after-tax portfolio of more than $19 million. The Tables also illustrate that under a traditional plan the after-tax portfolio is approximately $8.4 million, about one half of portfolio value offered by the MESOP installment sale plan. Further, the Tables also illustrate that at a 7% present value rate, MESOP installment sale plan produces a cost of $599,752 to the buyer. On the other hand, at the same rate, the traditional installment sale plan produces a cost of $845,298, more than 40% more than from the MESOP installment sale plan.

Although the invention has been described in detail with reference only to the presently preferred embodiment, those skilled in the art will appreciate that various modifications can be made without departing from the invention. Accordingly, the invention is defined only by the following claims which are intended to embrace all equivalents thereof.

What is claimed is:

1. A method of processing and displaying financial data in a digital computer comprising the steps of:
    electronically inputting contribution data into the digital computer, wherein the contribution data corresponds to periodic contributions into an account at the beginning of a plurality of accounting periods;
    processing the contribution data in the digital computer to produce digital data representing after tax cost of interest on first loan amounts made based on the cumulative cash values of an insurance policy issued based on the periodic contributions into the account;
    producing in the digital computer digital data representing investment income derived from the cash value of the first loan amounts less the after tax cost of interest; and
    displaying data representing financial results, including investment income derived from the cash value of the first loan amounts less the after tax cost of interest, in a suitable format on a display device to an investor who then invests the contributions in accordance with the financial results.

2. The method of claim 1 further including the step of displaying device.

3. The method of claim 1 further including the steps of displaying after tax cost of interest on second loan amounts made to cover tax liabilities of the periodic contributions, wherein investment income is displayed based on the first loan amounts less the after tax cost of interest of the first loan amounts and second loan amounts; and displaying after tax cost of interest on the second loan amounts to the display device.

4. The method of claim 3 further including the steps of displaying investment income derived from the second loan amounts, and displaying investment income derived from the second loan amounts to the display device.

5. The method of claim 1, wherein the contribution data represents periodic contributions to a personal wealth accumulation account.

6. The method of claim 1, wherein the contribution data represents periodic contributions to a deferred compensation account.

7. The method of claim 1, wherein the contribution data represents periodic contributions to a pension benefit account.

8. The method of claim 1, wherein the contribution data represents periodic contributions to a stock option account.

9. The method of claim 1, wherein the contribution data represents periodic contributions to an employee benefit account.

10. The method of claim 1, wherein the contribution data represents periodic contribution to an installment sale account.

11. The method of claim 1 further including the step of displaying death benefits paid under the insurance contract, wherein death benefits is added to displayed investment income.

12. The method of claim 1 further including the steps of displaying data representing the cost of providing a deferred compensation plan based on death benefits paid under the insurance contract; and displaying the cost of providing the deferred compensation plan.

13. The method of claim 1 further including the steps of displaying the cost of providing a pension benefit plan based on death benefits paid under the insurance contract; and displaying the cost of providing the pension benefit plan.

14. The method of claim 1 further including the steps of displaying the cost of providing a stock option plan based on death benefits paid under the insurance contract; and displaying the cost of providing the stock option plan.

15. The method of claim 1 further including the step of displaying the cost of providing an employee benefit plan based on death benefits paid under the insurance contract; and displaying the cost of providing the employee benefit plan.

16. The method of claim 15, wherein the cost of providing the employee benefit plan includes the cost of providing a high deductible health insurance plan.

17. A method for processing and displaying financial data in a computer comprising the steps of:
 purchasing an insurance policy having cumulative cash values that correspond to periodic contributions into an account at the beginning of a plurality of accounting periods;
 storing in a computer memory input data corresponding to the periodic contributions;
 retrieving the input data from the computer to produce cumulative cash values of the insurance issued policy based on the periodic contributions; and
 displaying data representing financial results, including investment income derived from cash values of loans made based on the cash values of the insurance policy less after tax cost of interest on the loans, in a suitable format on a display device to an investor who then invests the contributions in accordance with the financial results.

18. The method of claim 17 further including the step of displaying data representing cumulative cash values and after tax cost of interest.

19. The method of claim 17 further including the steps of displaying after tax cost of interest on second loan amounts made to cover tax liabilities of the periodic contributions, wherein the investment income is displayed based on the first loan amounts less the after tax cost of interest of the first loan amounts and second loan amounts; and displaying after tax cost of interest on the second loan amounts.

20. The method of claim 19 further including the steps of displaying investment income derived from the second loan amounts, and displaying investment income derived from the second loan amounts.

21. The method of claim 17, wherein the contribution data represents periodic contributions to a personal wealth accumulation account.

22. The method of claim 17, wherein the contribution data represents periodic contributions to a deferred compensation account.

23. The method of claim 17, wherein the contribution data represents periodic contributions to a pension benefit account.

24. The method of claim 17, wherein the contribution data represents periodic contributions to a stock option account.

25. The method of claim 17, wherein the contribution data represents periodic contributions to an employee benefit account.

26. The method of claim 17, wherein the contribution data represents periodic contribution to an installment sale account.

27. The method of claim 17 further including the step of displaying death benefits paid under the insurance contract, wherein the death benefits is added to the investment income.

28. The method of claim 17 further including the steps of displaying the cost of providing a deferred compensation plan based on digital data representing death benefits paid under the insurance contract; and displaying the cost of providing the deferred compensation plan.

29. The method of claim 17 further including the steps of displaying the cost of providing a pension benefit plan based on death benefits paid under the insurance contract; and displaying the cost of providing the pension benefit plan.

30. The method of claim 17 further including the steps of displaying the cost of providing a stock option plan based on death benefits paid under the insurance contract; and displaying the cost of providing the stock option plan.

31. The method of claim 17 further including the step of displaying the cost of providing an employee benefit plan based on death benefits paid under the insurance contract; and displaying the cost of providing the employee benefit plan.

32. The method of claim 31, wherein the cost of providing the employee benefit plan includes the cost of providing a high deductible health insurance plan.

33. A financial data processing and displaying apparatus that processes data resulted from an insurance policy having cumulative cash values that correspond to periodic contributions into an account at the beginning of a plurality of accounting periods, comprising:
 input means for inputting data corresponding to periodic contributions to the account at the beginning of the plurality of accounting periods;
 tax calculation means that generates data representing tax consequences associated with the periodic contributions;
 interest cost calculation means that generates data representing calculated after tax cost of interest on periodic first loan amounts made based on cumulative cash values of the insurance policy and second loan amounts that correspond to the calculated tax consequences; and
 a display means that displays financial results, including the calculated investment income, in a suitable format to an investor who then invests the contributions in accordance with the financial results.

34. The apparatus of claim 33 further including means for producing data representing investment income derived from the second loan amounts, and displaying investment income derived from the second loan amounts to display means.

35. The apparatus of claim 33, wherein the contribution data represents periodic contributions to a personal wealth accumulation account.

36. The apparatus of claim 33, wherein the contribution data represents periodic contributions to a deferred compensation account.

37. The apparatus of claim 33, wherein the contribution data represents periodic contributions to a pension benefit account.

38. The apparatus of claim 33, wherein the contribution data represents periodic contributions to a stock option account.

39. The apparatus of claim 33, wherein the contribution data represents periodic contributions to an employee benefit account.

40. The apparatus of claim 33, wherein the contribution data represents periodic contribution to an installment sale account.

41. The apparatus of claim 33 further including means for producing digital data representing death benefits paid under the insurance contract, wherein the data representing death benefits is added to the data representing investment income.

42. The apparatus of claim 33 further including means for displaying the cost of providing a deferred compensation plan based on digital data representing death benefits paid under the insurance contract.

43. The apparatus of claim 33 further including means for displaying the cost of providing a pension benefit plan based on digital data representing death benefits paid under the insurance contract.

44. The apparatus of claim 33 further including means for displaying the cost of providing a stock option plan based on digital data representing death benefits paid under the insurance contract.

45. The apparatus of claim 33 further including means for displaying the cost of providing an employee benefit plan based on digital data representing death benefits paid under the insurance contract.

46. The apparatus of claim 45, wherein data representing the cost of providing the employee benefit plan includes the cost of providing a high deductible health insurance plan.

* * * * *